United States Patent
Lee et al.

(10) Patent No.: US 7,446,963 B2
(45) Date of Patent: Nov. 4, 2008

(54) LENS ACTUATING DEVICE

(75) Inventors: Chao-Ping Lee, Lujhu Township (TW);
Chen-Yi Huang, Lujhu Township (TW);
Tai-Hung Shih, Lujhu Township (TW)

(73) Assignee: Sunnytec Electronics Co., Ltd, Lujhu Township, Kaohsiung (TW)

( * ) Notice: Subject to any disclaimer, the term of this patent is extended or adjusted under 35 U.S.C. 154(b) by 159 days.

(21) Appl. No.: 11/614,400

(22) Filed: Dec. 21, 2006

(65) Prior Publication Data

US 2008/0106813 A1  May 8, 2008

(30) Foreign Application Priority Data

Apr. 18, 2006 (TW) ............................... 95113773 A

(51) Int. Cl.
*G02B 7/02* (2006.01)
*G02B 15/14* (2006.01)
*G03B 3/10* (2006.01)

(52) U.S. Cl. .................. 359/824; 359/823; 359/694; 359/696; 396/133

(58) Field of Classification Search ................ 359/814, 359/818, 822–824, 665, 694–701; 396/75, 396/79, 80, 133; 310/311, 323.17, 328, 335; 235/375; 398/201
See application file for complete search history.

(56) References Cited

U.S. PATENT DOCUMENTS

| | | | | |
|---|---|---|---|---|
| 5,225,941 | A * | 7/1993 | Saito et al. ................... | 359/824 |
| 5,490,015 | A * | 2/1996 | Umeyama et al. ............ | 359/824 |
| 5,587,846 | A * | 12/1996 | Miyano et al. ............... | 359/824 |
| 5,644,440 | A * | 7/1997 | Akada ......................... | 359/823 |
| 5,675,444 | A * | 10/1997 | Ueyama et al. .............. | 359/824 |
| 7,099,093 | B2 * | 8/2006 | Jeong et al. .................. | 359/823 |
| 7,262,926 | B2 * | 8/2007 | Ohsato ........................ | 359/814 |
| 7,280,292 | B2 * | 10/2007 | Akiba et al. ................. | 359/819 |
| 7,365,914 | B2 * | 4/2008 | Sasaki et al. ................. | 359/696 |

* cited by examiner

*Primary Examiner*—Loha Ben
(74) *Attorney, Agent, or Firm*—Kelly Lowry & Kelly, LLP

(57) ABSTRACT

A lens actuating device is applicable in a lens module. The lens module has at least a housing and a lens support in the space formed by the housing. The lens actuating device has at least a base disposed in the housing, a piezoelectric element disposed on the base for generating kinetic energy, a clamping component disposed on the piezoelectric element and a linkage element coupled to the lens support and clamped in the clamping component. The clamping component makes a corresponding motion upon receiving a kinetic energy created by the piezoelectric element, which allows a stick-slip friction to be generated in the clamping component to actuate the lens, thereby achieving optical zooming or focusing and avoiding the shortcomings of the prior art using for example a voice coil motor or a stepping motor.

23 Claims, 5 Drawing Sheets

LENS ACTUATING DEVICE

FIELD OF THE INVENTION

The present invention relates to lens actuating modules, and more particularly, to a lens actuating module applicable in a lens module to achieve optical zooming and focusing.

BACKGROUND OF THE INVENTION

Piezoelectric materials are widely used in various electronic devices, for example the optical zooming technique recently used in camera lenses is a high actuating force that utilizes piezoelectric materials.

Referring to FIG. 1A, shown is a driving structure 1 developed by Konica-Minolta Inc. using the principle of a smooth impact drive mechanism (SIDM). The driving structure 1 includes a retaining mount 10, a piezoelectric material 11 fixed to the retaining mount 10, a frictional rod 12 attached to the piezoelectric material 11, and a corresponding shifting element 13 sheathing the frictional rod 12. The piezoelectric material 11 is electrically connected to a power (not shown). The voltage of the power changes periodically. When there is a voltage, the piezoelectric material 11 swells; when the voltage disappears, the piezoelectric material 11 restores to its original shape. Such moving mechanism causes the frictional material 12 to deform and actuate the shifting element 13 to shift along the frictional rod 12.

Referring to FIG. 1B, the driving structure 1 is combined with a lens module 14. The lens module 14 includes a first lens 140, a second lens 141 and a third lens 142. The second lens 141 is disposed between the first lens 140 and the third lens 142. The driving structure 1 is attached to the second lens 141 via the shifting element 13. The retaining mount 10 is fixed to a housing (not shown) encasing the lens module 14. When the power is supplied to the piezoelectric material 11, the shifting element 13 shifts along the frictional rod 12, causing the second lens 141 to move between the first and third lenses, thereby achieving optical zooming.

As can be seen from the drawing, the piezoelectric material 11 has a cross-sectional area slightly smaller than that of the retaining mount 10, but slightly bigger than that of the frictional rod 12. Such a design ensures the piezoelectric material 11 is in complete contact with the retaining mount 10 and the frictional rod 12 is in complete contact with the piezoelectric material 11, so that kinetic force can be integrally transferred to the frictional rod 12. However, this may lead to the problem of insufficient stability due to contact faces between elements being too small. In addition, the retaining mount 10, the piezoelectric material 11 and the frictional rod 12 must be symmetrical with respect to a common interlarding axis in order to have standardized specifications, so precision of alignment during the manufacturing process is required. When applying to small electronic devices such as a mobile phone, the driving structure 1 must be reduced and a more precise aligning technique must be employed to achieve the symmetrical structure. Moreover, the cross-sectional areas of the retaining mount 10, the piezoelectric material 11 and the frictional rod 12 are all cylindrical, which is rather difficult to manufacture and may increase the cost of manufacturing.

Furthermore, when applying to small electronic devices, the piezoelectric material 11 must be reduced in proportion, which may have the problem of insufficient kinetic force.

In addition, the frictional rod 12 would gradually wear out and be rendered unusable in the long term due to friction with the shifting element 13. In this case, since the frictional rod 12 is fixed to the piezoelectric material 11 and the second lens 141, the whole driving structure 1 and the second lens 141 need to be replaced.

Moreover, since the driving structure 1 is cylindrical, so it cannot be completely adhered to the housing of the electronic device. In order to fasten the retaining mount 10, an additional component is required in the housing to encase the retaining mount 10 while being fixed to the housing so as to fasten the driving structure. Consequently, more space is occupied in the electronic device.

Furthermore, as for the design of the structure developed by KONICA-MINOLTA Inc., all the components are sequentially installed on the same axis, which would result in a long length that presents a problem when applying to a small device such as a mobile phone. In result, the mobile phone is still thick as usual, and is contradictory to the trend toward thin and compact appearance of the portable electronic devices.

Therefore, there is a need for a solution that addresses and solves the abovementioned shortcomings of the prior art.

SUMMARY OF THE INVENTION

In the light of foregoing drawbacks, an objective of the present invention is to provide a lens actuating device applicable to electronic devices in all sizes. Another objective of the present invention is to provide a lens actuating device that has a stable structure.

Still another objective of the present invention is to provide a lens actuating device that conserves the inner space of the electronic device.

Yet another objective of the present invention is to provide a lens actuating device that has sufficient actuating force.

Still another objective of the present invention is to provide a lens actuating device that saves manufacturing costs.

Still another objective of the present invention is to provide a lens actuating device that effectively reduces the length of the lens actuating device for application in small electronic devices.

In accordance with the above and other objectives, the present invention provides a lens actuating device applicable in a lens module, wherein the lens module comprises a housing and a lens support in the space formed by the housing, the lens actuating device comprising: a base disposed in the housing; a piezoelectric element corresponding to the base and disposed on the base for generating kinetic energy upon power being supplied thereto; a clamping component disposed on the piezoelectric element comprising a clamping part that generates a clamping force for making a corresponding movement in response to receiving the kinetic energy generated by the piezoelectric element; and a linkage element coupled to the lens support and clamped in the clamping part of the clamping component by the clamping force that moves correspondingly due to a stick-slip friction generated with respect to the clamping part making the corresponding movement, thereby actuating the lens support to achieve optical zooming or focusing.

The shape of the housing can be rectangular (or square). The housing may comprise a receiving portion for receiving the lens support and a containing portion connected to the receiving portion for containing the lens actuating device, the receiving portion being circular that corresponds to the lens support.

The lens module may further comprise a guiding portion in the space forced by the housing. The lens support may comprise an encasing portion that corresponds to the guiding portion. The guiding portion is used to guide the movement of the lens support when encased within the encasing portion. The guiding portion may be a column and the encasing portion may be a hollow cylinder. The guiding portion is disposed at the corner of the space formed by the housing.

The base may be a rigid object having a first face and a second face corresponding to each other, and the base is coupled to the housing via the first face. The base may for example be a triangular or rectangular column, at least a side of which can be adhered to the inner face of the housing to conserve space, or may even attached to a corner of the housing to enhance stability of the lens actuating device. The piezoelectric element corresponds to the base and disposed on the second face of the base. Since the base is rigid and coupled to the housing, the kinetic energy generated by the piezoelectric element is solely transmitted to the clamping component to obtain the maximum actuating force. Additionally, the piezoelectric element may be a multi-layer actuator, and the power received by the piezoelectric element is provided by a driving circuit.

The clamping component may comprise a base element and an elastic element coupled to the base element. In one embodiment, the base element has a first clamping arm while the elastic element has a second clamping arm with elasticity corresponding to the first clamping arm. The clamping part is consisted of the first clamping arm and the second clamping arm. The clamping force generated by the clamping part being a result of the elasticity of the second clamping arm.

The linkage element may be a column, wherein both ends of which can be coupled to the lens support and the middle part of which clamped in the clamping part by the clamping force exerted by the clamping part of the clamping component.

Compared to the traditional driving structure that is instable and wherein the contact areas between various elements are small, the base and the piezoelectric element of the lens actuating device of the present invention are corresponding to each other and less easy to be detached. In addition, under the same surface area on which the piezoelectric element is located, a larger piezoelectric element can be used since the base and the piezoelectric element corresponds to each other, thus generating a greater actuating force.

Moreover, in the traditional driving structure, the requirements for symmetrically combined and circular elements raise challenges in the manufacturing process. In contrast, the lens actuating device of the present invention eliminates the problem in terms of symmetry since the base and the piezoelectric element corresponds to each other while the shape of the elements can be triangular or square columns that are easier to manufacture than those of the prior art, thereby reducing manufacturing costs.

Furthermore, the cylindrical shape of the driving structure of the prior art hinders the space being used efficiently. The shape of the base and the piezoelectric element of the lens actuating device of the present invention can be triangular or square columns that can be position to a corner of the housing to conserve space. Additionally, the base can be combined to the housing by adhering to its side to enhance stability.

In addition, when the frictional rod of the traditional driving structure is unusable, the whole driving structure has to be replaced, while only the linkage element clamped in the clamping part of the clamping component needs to be replaced when unusable.

Moreover, the various elements of the traditional driving structure are sequentially configured on the same axis, thus posing limitation to application in small electronic devices since reduction of the length of the axis is limited. In comparison, the linkage element in the lens actuating module of the present invention is clamped by the clamping component and disposed on one side of the piezoelectric element, which allows the overall length to be greatly reduced and facilitates application in small electronic devices.

In conclusion, the lens actuating device of the present invention saves space and costs and is applicable to electronic devices in all sizes and stable and easy to assemble in terms of its structure. Thus, the present invention has high industrial value.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE EMBODIMENTS

The present invention is described by the following specific embodiments. Those with ordinary skills in the arts can readily understand the other advantages and functions of the present invention after reading the disclosure of this specification. The present invention can also be implemented with different embodiments. Various details described in this specification can be modified based on different viewpoints and applications without departing from the scope of the present invention.

First Embodiment

Figure 1A:
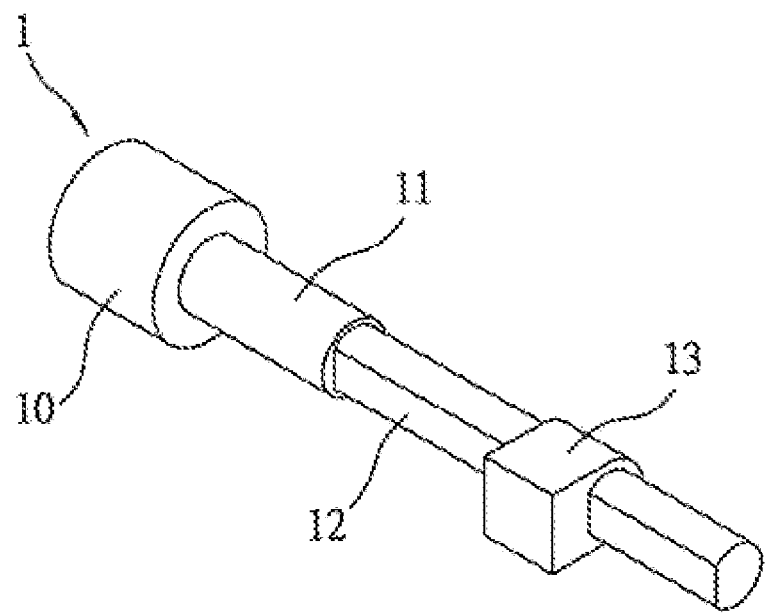
FIG. 1A (PRIOR ART) illustrates a traditional driving structure with a piezoelectric material available from KONICA-MINOLTA Inc.
Figure 1B:
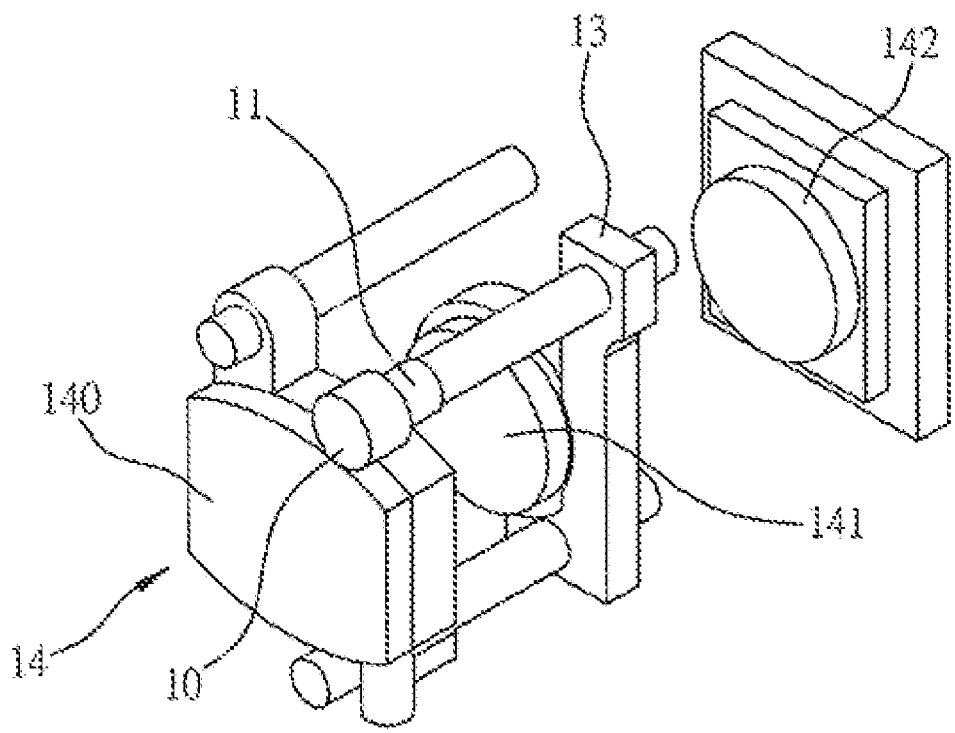
FIG. 1B (PRIOR ART) is a schematic diagram showing the traditional driving structure combined with a lens module.
Figure 2:
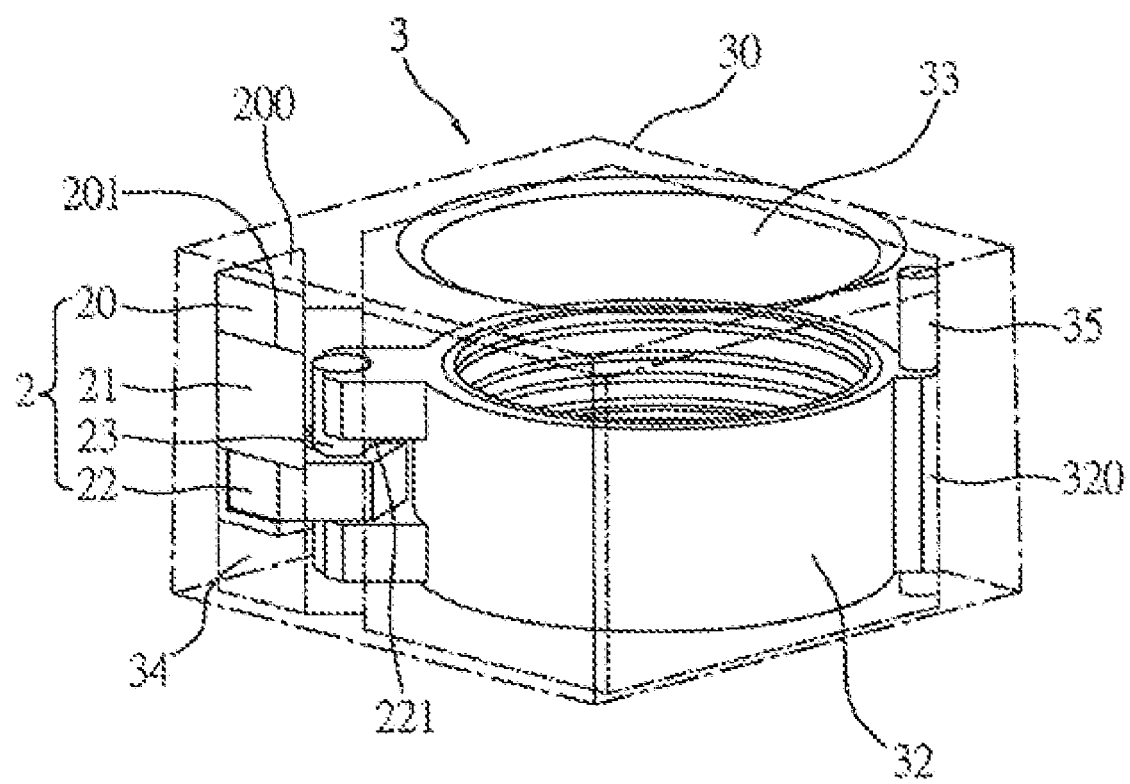
FIG. 2 is a first embodiment of the lens actuating device of the present invention applicable in a lens module.

Referring to FIG. 2, a first embodiment of a lens actuating device 2 of the present invention is shown. The lens actuating device 2 is applicable to a lens module 3. The lens module 3 comprises a housing 30 and a lens support 32 formed in a receiving space of the housing 30. The lens actuating device 2 comprises a base 20 disposed in the housing 30, a piezoelectric material 21 corresponding to the base 20 and disposed on the base 20 for providing kinetic energy upon power being supplied thereto, a clamping component 22 disposed on the piezoelectric element 21 and having a clamping part 221 that moves in response to the kinetic energy received from the piezoelectric element 21, and a linkage element 23 coupled to the lens support 32 and clamped in a clamping part 221 of the clamping component 22 that moves correspondingly due to a "stick-slip" friction generated with respect to the clamping part 221. As a result, the lens support 32 is actuated to achieve optical zooming or focusing.

The housing 30 has a rectangular (or square) cross section and has a receiving portion 33 for receiving the lens support 32, and a containing portion 34 connected to the receiving portion 33 for containing the lens actuating device 2. The receiving portion 33 has a circular cross section, in accordance with that of the lens support 32.

The lens module 3 further comprises a guiding portion 35 received in the receiving space formed in the housing 30. The lens support 32 comprises an encasing portion 320 that corresponds to the guiding portion 35, for guiding the movement of the lens support 32 when the guiding portion 35 is encased within the encasing portion 320. The guiding portion 35 has a columnar structure and the encasing portion 320 is a hollow cylinder. The guiding portion 35 is disposed at a corner of the receiving space formed in the housing 30.

The base 20 is rigid, and is, for example, a metallic element. The base 20 comprises a first face 200 and a second face 201 opposing to the first face 200. The base 20 is coupled to the housing 30 via the first face 200. The base 20 is a triangular column, wherein at least a side of which is attached to an inner face of the housing 30 for space saving. The piezoelectric element 21 is also a triangular column corresponding to the base 20 and disposed on the second face 201 of the base 20. Since the base 20 is rigid and coupled to the housing 30, the kinetic force generated by the piezoelectric element 21 is transmitted solely to the clamping component 22, thus obtaining the actuating force as large as possible. Additionally, the piezoelectric element 21 is a multi-layer actuator, and the power received by the piezoelectric element 21 is supplied by a driving circuit (not shown). The base 20 and the piezoelectric element 21 can be isosceles right triangular columns that correspond to the shape of the corner of the housing 30, so as to allow the base 20 to couple to the corner of the housing 30 in order to improve stability of the lens actuating device 2.

Figure 3:
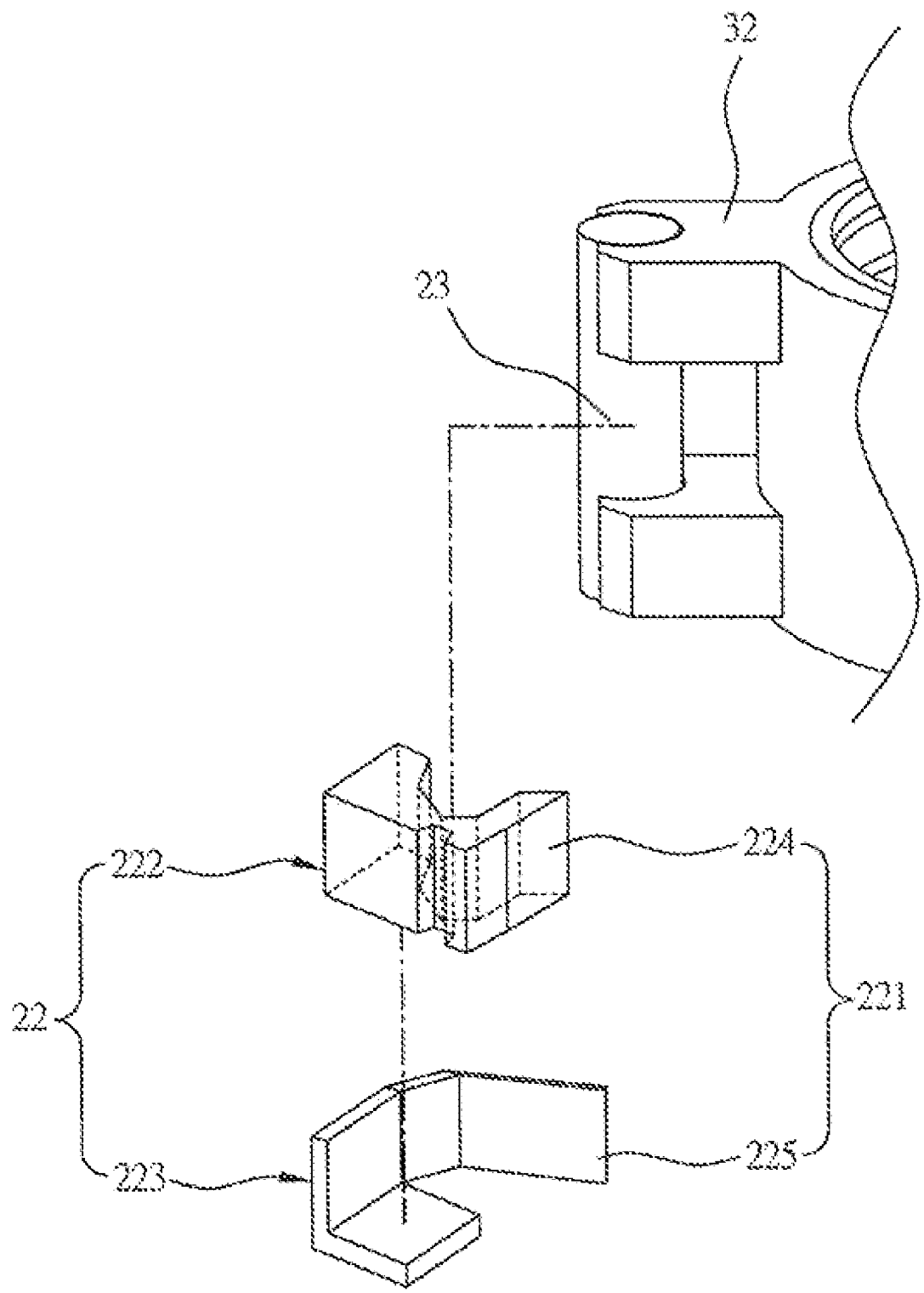
FIG. 3 is an exploded diagram of a clamping component and a linkage element of the first embodiment of the lens actuating device of the present invention.

Referring to FIG. 3, the clamping component 22 further comprises a base element 222 and an elastic element 223 correspondingly joined with the base element 222. The base element 222 has a first clamping arm 224. The elastic element has an elastic second clamping arm 225 corresponding to the first clamping arm 224. The clamping part 221 is consisted of the first clamping arm 224 and the second clamping arm 225. A clamping force generated by the clamping part 221 is a result of the elasticity of the second clamping arm 225.

Furthermore, the linkage element 23 is a column, wherein both ends of which are coupled to the lens support 32 and the middle part of which is positioned in the clamping part 221 owing to the clamping force of the clamping part 221. The linkage element 23 and the lens support 32 are detachable from each other. The lens support 32 may have for example a hook structure for coupling the linkage element 23. Consequently, only the linkage element 23 needs to be replaced when worn out.

Second Embodiment

Figure 4:
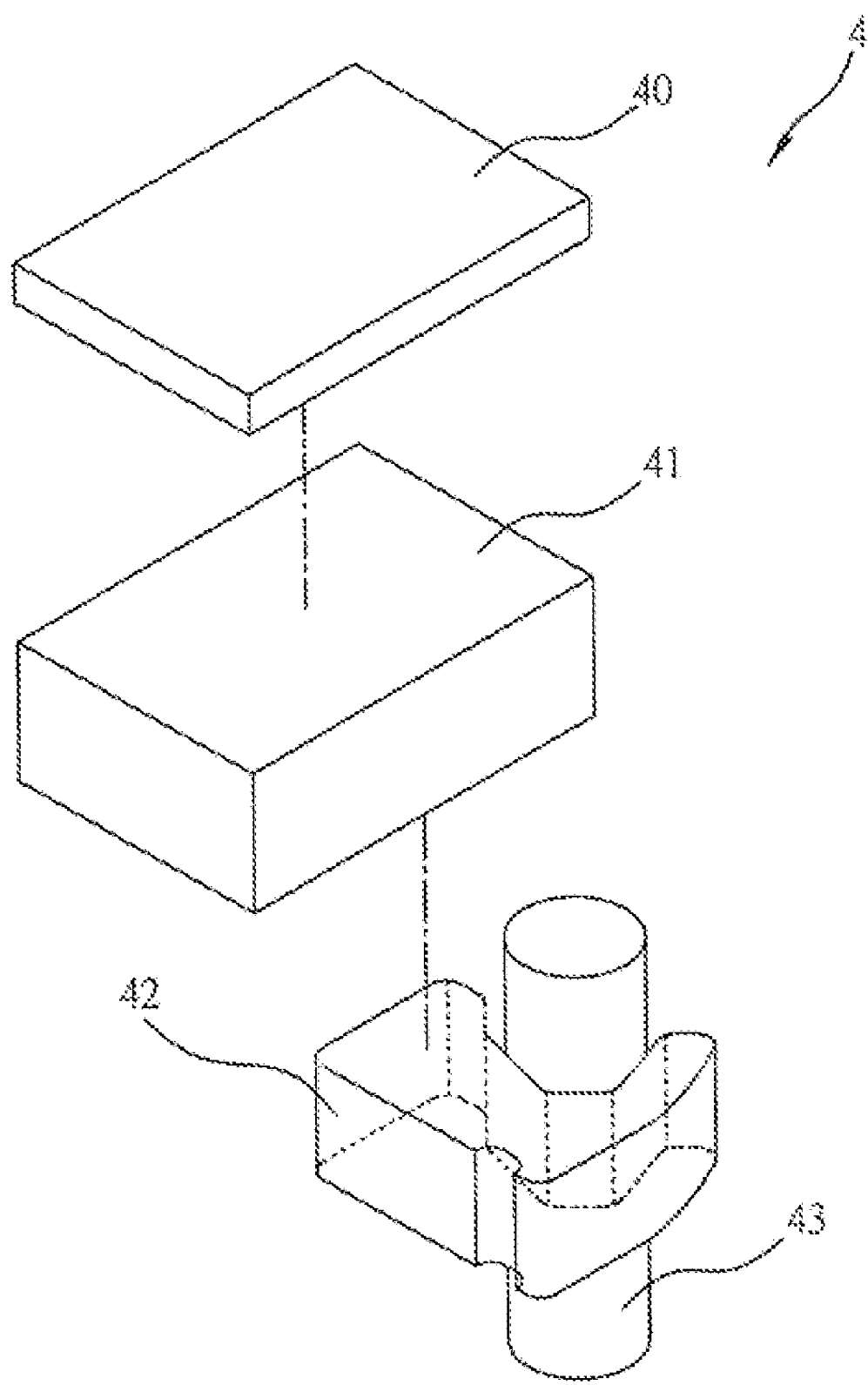
FIG. 4 is a second embodiment of the lens actuating device of the present invention.

Referring to FIG. 4, the second embodiment is similar to the first embodiment, except that the base 40 of the lens actuating device 4 of the second embodiment and the corresponding piezoelectric element 41 are rectangular columns. The clamping component 42 and the linkage element 43 of the second embodiment are the same to those in the first embodiment.

Third Embodiment

Figure 5A:
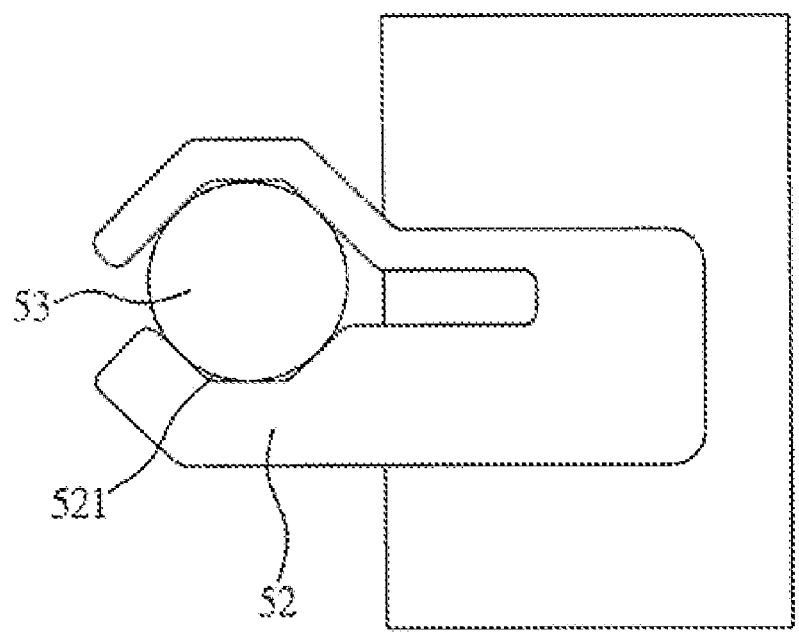
FIG. 5A is a top view of a third embodiment of the lens actuating device of the present invention.
Figure 5B:
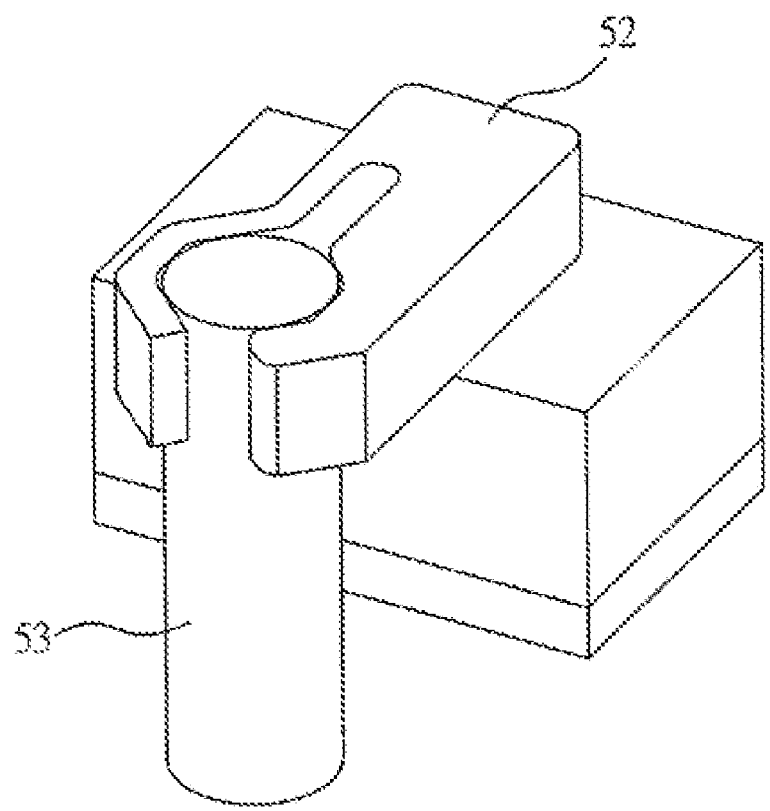
FIG. 5B is an oblique view of the third embodiment of the lens actuating device of the present invention.

Referring to FIGS. 5A and 5B, the third embodiment is similar to the first embodiment, except that the clamping component 52 of the third embodiment is made of an elastic material integrally as one. Additionally, one end of the linkage element 53 is coupled to the lens (not shown), while the other end is clamped within the clamping part 521 by the clamping force exerted from the clamping part 521 of the clamping component 52. The clamping force of the clamping part 521 is symmetrical with respect to the central axis of the linkage element 53.

Compared to the traditional driving structure that is instable and wherein the contact areas between various elements are small, the base and the piezoelectric element of the lens actuating device of the present invention are corresponding to each other and less easy to be detached. In addition, under the same surface area on which the piezoelectric element is located, a larger piezoelectric element can be used since the base and the piezoelectric element corresponds to each other, thus generating a greater actuating force.

Moreover, in the traditional driving structure, the requirements for symmetrically combined and circular elements raise challenges in the manufacturing process. In contrast, the lens actuating device of the present invention eliminates the problem in terms of symmetry since the base and the piezoelectric element corresponds to each other while the shape of the elements can be triangular or square columns that are easier to manufacture than those of the prior art, thereby reducing manufacturing costs.

Furthermore, the cylindrical shape of the driving structure of the prior art hinders the space being used efficiently. The shape of the base and the piezoelectric element of the lens actuating device of the present invention can be triangular or square columns that can be position to a corner of the housing to conserve space. Additionally, the base can be combined to the housing by adhering to its side to enhance stability.

In addition, when the frictional rod of the traditional driving structure is unusable, the whole driving structure has to be replaced, while only the linkage element clamped in the clamping part of the clamping component needs to be replaced when unusable.

Moreover, the various elements of the traditional driving structure are sequentially configured on the same axis, thus posing limitation to application in small electronic devices since reduction of the length of the axis is limited. In comparison, the linkage element in the lens actuating module of the present invention is clamped by the clamping component and disposed on one side of the piezoelectric element, which allows the overall length to be greatly reduced and facilitates application in small electronic devices.

In conclusion, the lens actuating device of the present invention saves space and costs and is applicable to electronic devices in all sizes and stable and easy to assemble in terms of its structure.

The above embodiments are only used to illustrate the principles of the present invention, and they should not be construed as to limit the present invention in any way. The above embodiments can be modified by those with ordinary skills in the arts without departing from the scope of the present invention as defined in the following appended claims.

What is claimed is:

1. A lens actuating device applicable in a lens module having a housing and a lens support received in a receiving space formed in the housing, the lens actuating device comprising:
   a base disposed in the housing;
   a piezoelectric element corresponding to the base and disposed on the base for generating kinetic energy upon power being supplied thereto;
   a clamping component disposed on the piezoelectric element and comprising a clamping part that generates a clamping force which moves in response to a receiving of the kinetic energy generated by the piezoelectric element; and a linkage element coupled to the lens support and clamped in the clamping part of the clamping component by the clamping force that moves correspondingly due to a stick-slip friction generated with respect to the clamping part making the corresponding movement, thereby actuating the lens support to achieve optical zooming or focusing.

2. The lens actuating device of claim 1, wherein the housing has a rectangular cross section.

3. The lens actuating device of claim 1, wherein the base is formed with a first face disposed in the housing, and a second face corresponding to the first face.

4. The lens actuating device of claim 3, wherein the base is located at a corner of the housing via the first face.

5. The lens actuating device of claim 3, wherein the piezoelectric element corresponds to the base and is disposed on the second face of the base.

6. The lens actuating device of claim 1, wherein the housing comprises a receiving portion for receiving the lens support, and a containing portion connected to the receiving portion for containing the lens actuating device, the receiving portion having a circular cross section and being corresponding to the lens support.

7. The lens actuating device of claim 1, wherein the kinetic energy generated by the piezoelectric element is provided solely to the clamping component by the base.

8. The lens actuating device of claim 7, wherein the base is rigid.

9. The lens actuating device of claim 1, wherein the base is rigid.

10. The lens actuating device of claim 9, wherein the rigid base is a metallic material.

11. The lens actuating device of claim 1, wherein the base is a triangular column, and the piezoelectric element is another triangular column that corresponds to the triangular column.

12. The lens actuating device of claim 1, wherein the base is an isosceles right triangular column, and the piezoelectric element is another isosceles right triangular column that corresponds to the isosceles right triangular column.

13. The lens actuating device of claim 1, wherein the base is a rectangular column, and the piezoelectric element is another rectangular column that corresponds to the rectangular column.

14. The lens actuating device of claim 1, wherein the piezoelectric element is a multi-layer actuator.

15. The lens actuating device of claim 1, wherein the clamping component comprises a base element and an elastic element coupled to the base element.

16. The lens actuating device of claim 15, wherein the base element has a first clamping arm, the elastic element has an elastic second clamping arm corresponding to the first clamping arm, the clamping part is composed of the first clamping arm and the second clamping arm, and the clamping force generated by the clamping part is a result of the elasticity of the second clamping arm.

17. The lens actuating device of claim 1, wherein the linkage element is a column, both ends of which are coupled to the lens support and the middle part of which being clamped in the clamping part by the clamping force exerted by the clamping part of the clamping component.

18. The lens actuating device of claim 1, wherein the linkage element is column, one end of which is coupled to the lens support and the other end of which being clamped in the clamping part by the clamping force exerted by the clamping part of the clamping component.

19. The lens actuating device of claim 18, wherein the clamping component is made of an elastic material integrally as one.

20. The lens actuating device of claim 1, wherein the lens module further comprises a guiding portion in the receiving space formed in the housing, the lens support comprises an encasing portion that corresponds to the guiding portion, wherein the guiding portion is used to guide the movement of the lens support when encased within the encasing portion.

21. The lens actuating device of claim 20, wherein the guiding portion is disposed at the corner of the receiving space formed in the housing.

22. The lens actuating device of claim 20, wherein the guiding portion is a column, and the encasing portion is a hollow cylinder.

23. The lens actuating device of claim 1, wherein the power received by the piezoelectric element is provided by a driving circuit.

* * * * *